Aug. 12, 1969 P.P. STEVENS, JR 3,460,860
FLEXIBLE CONNECTOR STRUCTURE
Filed Sept. 29, 1967 2 Sheets-Sheet 1
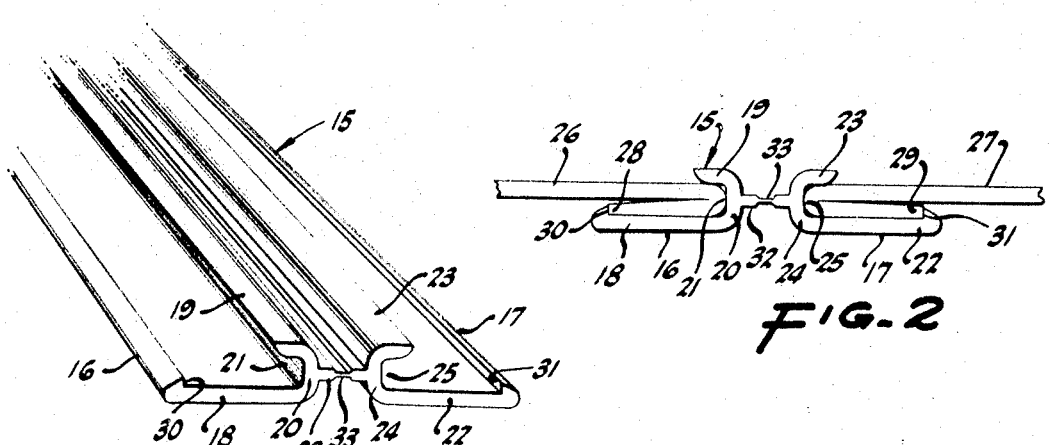
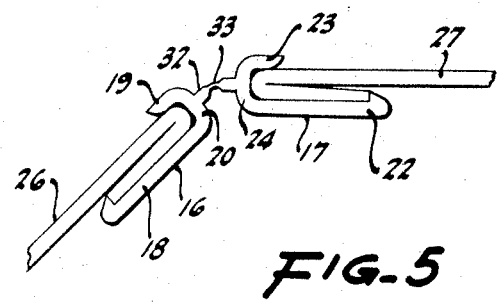
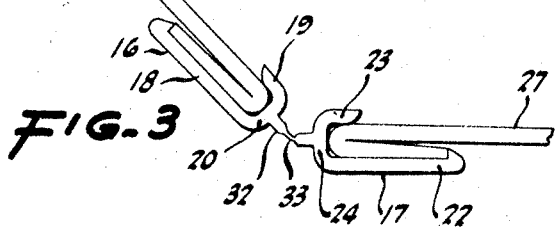
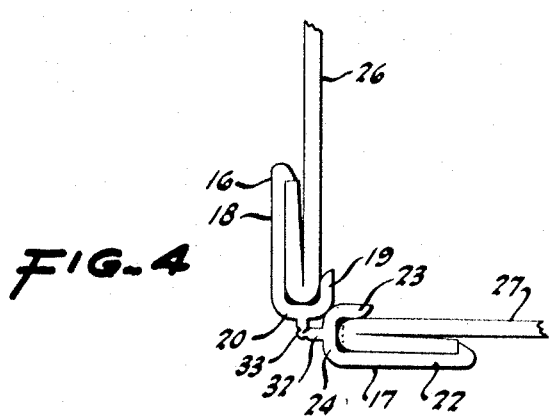
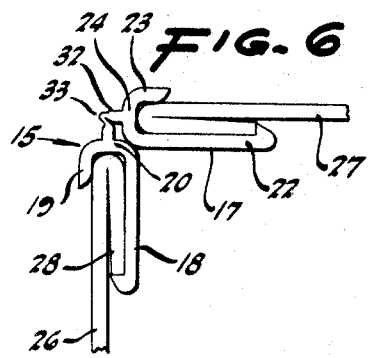
INVENTOR.
PETER P. STEVENS, JR.
BY
Stanley Bialos
ATTORNEY

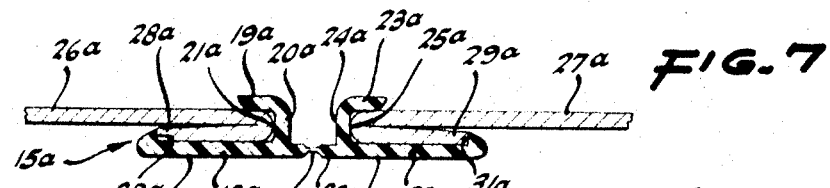
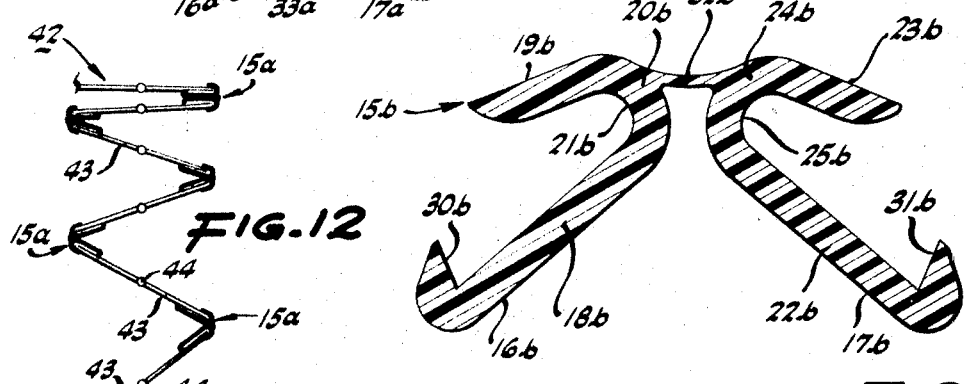
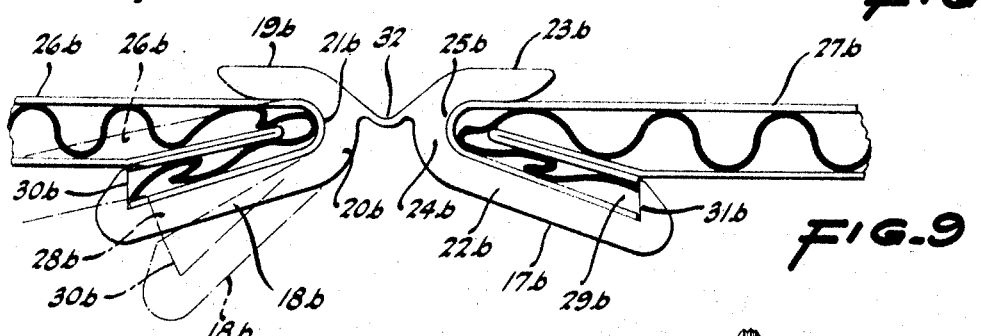
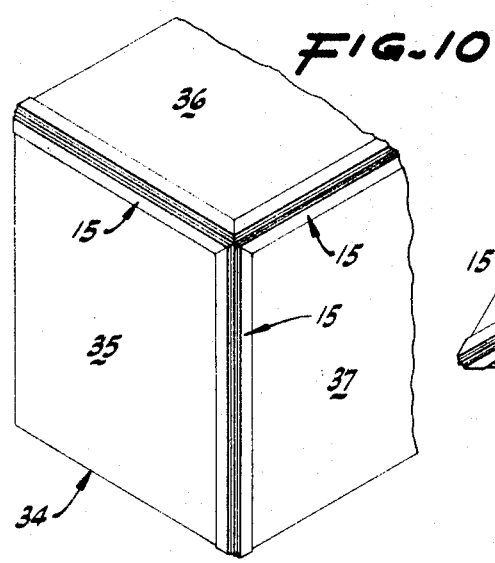
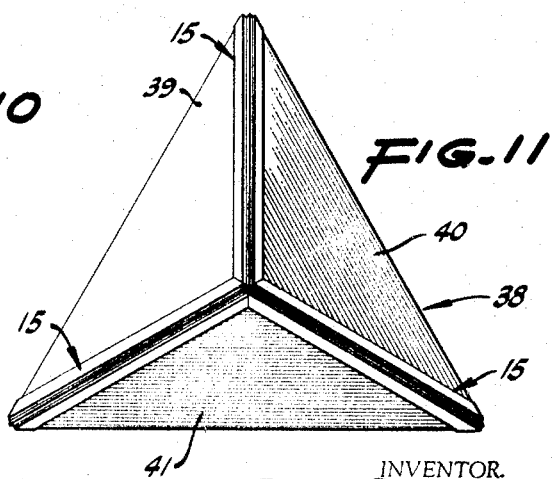

United States Patent Office 3,460,860
Patented Aug. 12, 1969

3,460,860
FLEXIBLE CONNECTOR STRUCTURE
Peter P. Stevens, Jr., Point Reyes Station, Calif., assignor to Walter Landor, San Francisco, Calif.
Filed Sept. 29, 1967, Ser. No. 671,869
Int. Cl. F16b 5/00; E04c 1/34; E04d 1/36
U.S. Cl. 287—20.92    12 Claims

ABSTRACT OF THE DISCLOSURE

Flexible connector structure for joining a pair of panel members along edge portions thereof. The connector structure takes the form of an elongated, one-piece extruded-plastic component comprising a pair of lock sections respectively equipped with means for interlockingly engaging the edge portions of such panel members, and further comprising a flexible strap extending between the lock sections and defining a hinge enabling the panel members to be oriented in a variety of angular positions relative to each other.

DISCLOSURE

This invention elates to a connector structure for use in joining one member with another, and it relates more particularly to a flexible connector structure interlockingly engageable with a pair of panel members or the like along adjacent edge portions thereof to hingedly interconnect such members and thereby enable the same to be oriented in various angular positions relative to each other.

The range of instances is infinite in which it is necessary to connect one member with another, and included within such range are panel members which must be connected to each other along edge portions thereof, possibly to define a corner at the intersection of their planes, and members which are hingedly related to each other either for continued relative articulation or for purposes of initial adjustment. In the past, connector structures have been proposed with the intention of providing a relatively quick and easy means for joining panel members at their edge portions, but for the most part such connector structures lack versatility and require rather special arrangements for effecting their interconnection with the panel members. Additionally, such connectors generally define a rigid or fixed relationship between the panel members joined thereby and, accordingly, are not useful in those cases where deviation from a predetermined relationship is required.

It is accordingly an object, among others, of the present invention to provide an improved connector structure useful in a great number of environments for the purpose of quickly and easily interconnecting a pair of members and at the same time affording articulation therebetween so that such members can be positioned in a number of relative angular dispositions either initially or continuously. The connector structure comprises a pair of lock sections and a flexible strap extending therebetween and defining a hinge permitting the lock sections to be displaced angularly relative to each other. Each such lock section is generally J-shaped in cross section and includes a pair of legs joined at their inner base ends to define a channel thereat. The longer leg of each lock section is equipped adjacent its outer end with a transversely extending abutment; and each such section is cooperative with a panel member along an edge portion thereof to interlockingly engage the same and thereby connect one panel member with another. The flexible strap establishes a bridge between the two lock sections to unite one panel member with the other, and the flexibility of the strap enables the panel members to be oriented relative to each other in a variety of angular dispositions.

Additional objects and advantages especially as concerns particular details and characteristics of the invention will become apparent as the specification develops.

Embodiments of the invention are illustrated in the accompanying drawings in which:

FIGURE 1 is a broken perspective view of a flexible connector structure embodying the invention;

FIGURE 2 is an end view in elevation of a connector structure of the type shown in FIGURE 1 in interlocking engagement with a pair of panel members, the panels being oriented with respect to each other to define an angle of approximately 180°;

FIGURES 3 and 4 are each an end view in elevation illustrating the panel members being displaced in one angular direction relative to each other and respectively showing such panel members at an obtuse angle and at a right angle;

FIGURES 5 and 6 are each an end view in elevation illustrating the panel members being displaced in an opposite angular direction relative to each other and respectively showing such panel members at an obtuse angle and at a right angle;

FIGURE 7 is a transverse sectional view illustrating a modified flexible connector structure in interlocking engagement with a pair of panel members;

FIGURE 8 is an enlarged transverse sectional view of a further modified flexible connector structure;

FIGURE 9 is an end view in elevation of the connector structure shown in FIGURE 8 in association with a pair of panel members, and in which one lock section of the connector structure is shown by phantom lines in an intermediate position during assembly thereof with a panel member;

FIGURE 10 is a broken perspective view of a geometric structure in the form of a cube in which at least certain of the wall panels thereof are interconnected by flexible connector structures embodying the present invention;

FIGURE 11 is a top plan view of a geometric structure in the form of a pyramid in which at least certain of the wall panels thereof are interconnected by flexible connector structures embodying the present invention; and FIGURE 12 is a top plan view of a foldable door comprised of a plurality of panel members hingedly secured to each other by connector structure embodying the invention.

The flexible connector structure illustrated in FIGURES 1 through 6 is designated in its entirety with the numeral 15, and it comprises a pair of transversely spaced and longitudinally extending lock sections 16 and 17. Each of the lock sections in cross section or end elevation has a generally J-shaped configuration defined by a pair of legs joined at their inner base ends and defining a channel thereat. In the case of the lock section 16, the longer of the two legs is denoted 18, the shorter leg 19, the inner base ends defining their joinder is denoted 20 and the channel formed thereat is designated with the numeral 21. As respects the lock section 17, the respectively corresponding elements are denoted 22, 23, 24 and 25.

As shown in FIGURE 2, the lock sections 16 and 17 are respectively adapted to interlockingly engage panel members 26 and 27 which may be formed of any suitable material such as wood, metal, plastic and paper, and such panels have abutments 28 and 29 provided therealong. In the particular instance illustrated in FIGURES 2 through 6, the panels 26 and 27 are folded upon themselves along an edge portion thereof for providing hingedly connected flaps to establish the abutments 28 and 29 spaced inwardly from the folded or hinged edges of and overlying the respective surfaces of the panels; and further as concerns the particular panels 26 and 27, they are formed of paperboard and specifically chipboard. Cooperatively engaging the abutment 28 is a stop or abutment 30 provided by the leg 18 adjacent the outer terminus thereof, and in a similar manner the leg 22 has a stop or abutment 31 formed at its outer terminus. In each instance, the abutments 30 and 31 are transversely oriented and, accordingly, project in the direction of the respectively associated legs 19 and 23 or, more exactly, toward the planes defined thereby.

The connector structure 15 further includes a strap 32 extending between the lock sections 16 and 17 and secured to each. The strip 32 defines a hinge that enables the lock sections 16 and 17 to be displaced angularly with respect to each other, as illustrated in FIGURES 3 through 6, and in this reference the strap 32 is flexible and may be provided with an intermediate portion 33 of reduced thickness along which articulation occurs. The strap 32 is also oriented as respects the inner base ends 20 and 24 of the lock sections at substantially the centers thereof which enables the lock sections to articulate relative to each other in opposite angular directions through substantially the same arcuate distances.

This freedom of movement is evidenced by comparing FIGURES 3 and 4 with FIGURES 5 and 6 and, as concerns these illustrations, FIGURE 3 denotes the lock section 16 and panel 26 carried thereby being rotated in a clockwise direction relative to the lock section 17 and panel 27 about the longitudinally extending hinge axis defined by the reduced section 33 of the strap 32. FIGURE 4 shows such clockwise displacement having continued until the legs 19 and 23 are in substantial abutment in which event the planes of the panels 26 and 27 are normally disposed. As concerns FIGURES 5 and 6, the first denotes the lock section 16 and panel 26 carried thereby being rotated in a counterclockwise direction relative to the lock section 17 and panel 27 about the longitudinally extending hinge axis defined by the reduced section 33 of the strap 32. FIGURE 6 shows such counterclockwise displacement having continued until the legs 18 and 22 are in substantial abutment in which event the planes or panels 26 and 27 are normally disposed.

The connector structure 15 is a one-piece component entirely integral, and it constitutes an extruded plastic material having the form shown in FIGURE 1 upon being expressed from the extrusion dies. The material selected for the connector structure 15 should provide sufficient flexibility at the strap 32 to enable the lock sections 16 and 17 to articulate with respect to each other in the manner explained; and any suitable flexible material may be employed for such purpose, preferably flexible plastic material. The length of the strap 32 between the lock sections 16 and 17 is a factor in the amount of bending and, in this respect, the greater the length of the hinge strap the more readily it can be flexed and the material selected for the connector structure may, accordingly, have less inherent flexibility. The range of suitable materials is great, and examples thereof are polyethylene, polypropylene, and vinyl plastics.

The spaced legs of each hinge section 16 and 17 are substantially thicker than the strap 32 and especially the reduced intermediate section 33 thereof, wherefore such legs are inherently stiffer than the strap. In this connection, it will be noted that the strap is relatively thin compared to the overall width between the outside surfaces of the legs at the channel therebetween. However, the legs are movable relative to each other, and each of the longer legs 18 and 22 accommodates sufficient deflection, especially toward the outer terminus thereof, to accommodate insertion of the panel section between the legs and interlocking engagement of the facing abutments (i.e., the abutments 28 and 30 in the case of the leg 18 and panel 26). Further, each pair of legs (18 and 19), for example) defines a wide mouth or opening therebetween which permits ready entrance or passage of the panel edge portion therethrough.

Such wide mouth, in conjunction with the limited permissible flexibility of the longer leg, enable each lock section to be interlockingly united with a panel member with considerable facility, yet once integration of these two components occurs, the relative stiffness of the legs constrains the panel member against movements in directions normal to the plane thereof, and the inner base end of the legs together with the associated abutment provided by the longer leg adjacent its terminus prevent displacements of the panel along the plane thereof in directions transverse to the axis of the connector structure. In certain instances, depending upon the coefficients of friction of the connector structure and panel members and the frictional inhibition to movement developed therebetween, relative longitudinal displacements of the panel and connector structure along the plane of the panel may be effected. Further description concerning insertion of a panel member into and interlocking engagement thereof with a lock section of the connector structure will be described more fully in association with the embodiment of the invention illustrated in FIGURES 8 and 9.

The modified embodiment of the invention illustrated in FIGURE 7 is substantially the same as the connector structure 15 heretofore described except for the location of the strap defining the hinge which permits articulation of one lock section relative to the other. Accordingly, the same numerals used in the description of the connector structure illustrated in FIGURES 1 through 6 are used to identify respectively corresponding elements of the modified connector structure shown in FIGURE 7 except that the suffix *a* has been added for purposes of differentiation between the two embodiments. With particular reference to the strap 32a, it is located along the legs 18a and 22a, rather than symmetrically located as in the case of the strap 32, and as a consequence of such location the lock sections 16a and 17a are angularly displaceable with respect to each other through a greater arcuate distance in one direction than in the opposite direction.

More particularly, considering the instance in which the lock section 16a is displaced in a clockwise direction with respect to the lock section 17a about the longitudinal axis defined by the restricted intermediate portion 33a of the strap 32a, the limit of permissible displacement in such direction is defined by abutment of the leg-and-base structure 19a, 20a with the leg-and-base structure 23a, 24a, and such abutment will occur at a disposition of the planes of the panel sections 26a and 27a whereat they define an arcuate angle. In the case of the section 16a being angularly displaced in a counterclockwise direction with respect to the lock section 17a, the limit of the permissible angular displacement in such direction is established by abutment of the leg 18a with the leg 22a, and such abutment will not occur until the legs are substantially parallel to each other in contiguous juxtaposition. Thus, in the counterclockwise direction, the lock section 16a and panel 26a carried thereby can traverse a much greater angular distance which approaches 180°.

Although the position or location of the hinge-defining strap is one of the controlling factors as respects the permissible relative angular displacements of the lock sections of the connector structures, as evidenced by the differing characteristics of the articulations attributable to the respective connector structures 15 and 15a, the length of the strap also is an influencing factor on the extent of the permissiable angular displacements. For example, as the length of the strap 32 of the connector structure 15 is decreased, the lock sections 16 and 17 are forced into closer proximity and will be able to traverse smaller angular displacements relative to each other in either direction before abutment of the lock sections limits their articulation. The same condition obtains with respect to the connector structure 15a because as the length of the strap 32a is decreased, abutment of the lock sections 16a and 17a will confine the permissible articulation of the lock sections to smaller arcuate distances. Contrarywise, as the straps 32 and 32a are increased in length, greater arcuate distances may be traversed by the respectively associated lock sections before the limits of angular movement are reached.

A further modified connector structure is illustrated in FIGURES 8 and 9 and it differs only in rather minor respects from the connector structures 15 and 15a heretofore considered. In view of this, the same numerals are again employed to identify respectively corresponding elements except that the suffix b is applied to each such numeral as it is used in FIGURES 8 and 9. The connector structure 15b is especially intended for use in interconnecting relatively thick panel sections such as the sections 26b and 27b shown in FIGURE 9 which constitute corrugated paperboard having an edge portion thereof folded upon itself to provide the abutments 28b and 29b. As a consequence of the thickness of such panels, the terminal edges thereof defining the associated abutments, abutment 29b for example, has a slight angular inclination and the mating abutment 31b therefor is provided with a slight inclination so as to conform thereto. Also, the planes of the legs 18b and 22b tend to diverge from the planes of the respectively associated legs 19b and 23b (rather than being essentially parallel as in the case of the connector structures 15 and 15a) in order to accommodate the progressively increasing thickness of the folded corrugated panel members toward the abutment edges thereof.

The relative flexibility of the two legs of any one of the J-shaped lock sections of each of the connector structures is most readily evident from a consideration of the connector structure 15b because of the greater thickness of the panels 26b and 27b as compared to the panels 26 and 27 and panels 26a and 27a. Considering FIGURE 9 in this relation, as the panel 26b is moved through the relatively wide mouth defined between the terminal ends of the legs 18b and 19b toward the channel 21b, the progressively increasing thickness of the panel member along the folded edge portion thereof tends to cam the leg 18b downwardly as such folded edge portion rides over the inner edge of the abutment 30b. Although from a functional point of view it makes no difference whether the leg 18b is desplaced and the leg 19 remains stationary, or vice versa, or whether each leg yields somewhat, the fact that the leg 18b is substantially longer than the leg 19b usually will result in its being displaced relative to the leg 19b.

This condition of relative flexibility is assumed in the pictorial representation of FIGURE 9, and the positions of the legs 18b and panel 26b just prior to interlocking engagement of the abutments 30b and 28b thereof are shown in broken lines in this figure. At about this time, the inner edge of the panel 26b is in substantial abutment with the channel 21b and the lower corner portion of the panel abutment 28b is in substantial alignment with the upper corner portion of the leg abutment 30b. Accordingly, the next increment of relative displacement between the panel section 26b and leg 18b will cause the contiguous corner portions of the aligned abutments 28b and 30b to slide over each other, whereupon the leg 18b will snap into interlocking engagement with the panel 26b and the lock section and panel member will assume the relative disposition of their counterpart lock section 17b and panel member 27b as shown in FIGURE 9.

As in the case of the two connector structure embodiments heretofore described, the connector structure 15b has a hinge-defining strap 32b permitting relative angular displacements of the lock sections 16b and 17b relative to each other in opposite angular directions. Further to this point and assuming as an initial orientation the configuration illustrated in FIGURE 8 (which the connector 15b will have upon extrusion thereof), the lock section 16b can be displaced in a counterclockwise direction relative to the lock section 17b through only a small angular distance before abutment of the legs 18b and 22b limits relative movement in such direction. With the strap 32b being of the relative length shown in FIGURES 7 and 8 and having the orientation depicted, the planes of the panels 26b and 27b will define an acute angle at the time of such abutment and such angle will approximate 60°. Angular displacement of the lock section 16b in a clockwise direction enables the same to traverse a much greater arc before displacement in such direction is limited by abutment of the leg 19b with the leg 23b, and at the time of such abutment the planes of the panels 26b and 27b will define an obtuse angle of approximately 110°. As explained heretofore, change in the limit and/or location of the strap 32b will affect the extent of the permissible relative angular displacements of the lock sections.

As suggested hereinbefore, the connector structures are especially useful in interlockingly coupling or joining panel members and because the connector structures are flexible, they enable such panel members to be disposed relation to each other at a variety of angular positions. This function of the connector structures is illustrated in FIGURES 10, 11 and 12 which respectively show a plurality of panel members interlockingly connected one with another in various dispositions. Thus, in FIGURE 10 a plurality of panel members are interconnected so as to define a cube and, accordingly, the intersecting panels form angles of substantially 90° at their lines of mergence. For identification, the cubic structure shown in FIGURE 10 is denoted with the numeral 34 and the three panels thereof which are illustrated are respectively designated 35, 36 and 37. Thus, the planes of the panels 35 and 36 define an angle of substantially 90° and they are interlockingly connected by flexible connector structure which, for purposes of positive identification, may be taken to be the connector structure 15. Similarly, the wall panel 37 defines 90° angles of intersection with the wall panels 35 and 36 and is connected to each by flexible connector structures 15. If the three connector structures 15 are brought into contact adjacent a corner of the cube 34, they may be cut at angles as shown in FIGURE 10 to effectively close the structure at such location.

In FIGURE 11 a plurality of panel members are interconnected so as to define a pyramid and, accordingly, the interconnecting panels define angles of substantially 60° at their lines of mergence. The pyramidal structure shown in FIGURE 11 is denoted with the numeral 38 and the three panels thereof which are illustrated are respectively designated 39, 40 and 41. Thus, the planes of the panels 39 and 40 define an angle of substantially 60° and they are interlockingly connected by flexible connector structure which, for purposes of identification, may be taken to be the connector structure 15. Similarly, the wall panel 41 defines 60° angles of intersection with the wall panels 39 and 40 and is connected to each by flexible connector structures 15. If the three connector structures 15 are brought into contact adjacent a corner of the pyramid 38, they may be cut at angles as shown in FIGURE 11 to effectively close the figure at such location.

In the structures illustrated in FIGURES 10 and 11, the respective wall panels thereof may be fixed when once assembled so that the flexibility of the connectors used with such structures may have a rather restricted life cycle as respects their flexibility. In the structural assemblage shown in FIGURE 12, the flexible connectors used therein are expected to the flexed through a substantial number of cycles because the assemblage defines a foldable door, generally denoted 42, adapted to be opened and closed as often as is convenient or desired. Accordingly, the active life cycle of such connectors should be relatively great. Considering the door structure 42 in greater detail, foldable doors of the type illustrated in FIGURE 12 comprise a plurality of rectangular panels 43 which are vertically oriented and have a height usually between six and seven feet so as to extend substantially from top to bottom of the conventional opening in which the door is mounted. The panels 43 are rather thin and usually quite narrow in a transverse direction and, by way of example, such transverse dimension is often about four inches.

The panels 43 are oriented with respect to each other so as to define accordion folds with the pivotal interconnections between adjacent panels being defined by flexible connector structures which may be taken to be the connetcors 15a. In the usual case, the panels 43 are hung or suspended from an overhead track through a plurality of depending pins 44 which permit the panels to pivot or rotate about the axes defined by the pins and which also permit the panels to move or translate bodily along such track as the door is opened and closed. This changeable angular positioning of the panels 43 is illustrated in FIGURE 12 in that the door 42 is positioned such that certain of the panels 43 are folded into parallel juxtaposition so that they extend transversely of the door opening, and other of the panels 43 display various degrees of articulation. As is well known, each time the door 42 is opened and closed, at least certain of the panels 43 move between dispositions of generally planar alignment and parallel adjacency.

Thus, in the case of each embodiment of the flexible connector structure, a pair of transversely spaced and longitudinally extending lock sections are provided which are respectively adapted to be secured to a pair of members which connection, in the usual instance, will be along the longitudinal edge portions of such members. Such connection is effected by inserting the longitudinal edge portion through the large mouth defined by the generally J-shaped configuration of the lock sections. The flexible strap formed integrally with and extending between the transversely spaced lock sections permits relative moveemnt therebetween to enable the members to be positioned at a variety of angular orientations relative to each other, and in certain instances, as indicated in FIGURE 12, such members can have their relative orientation changed from time to time.

While in the foregoing specification embodiments of the invention have been set forth in considerable detail for purposes of making a complete disclosure thereof, it will be apparent to those skilled in the art that numerous changes may be made in such details without departing from the spirit and principles of the invention.

What is claimed is:

1. A one-piece flexible connector structure of an integral mass of material for interconnecting one panel with another panel wherein each panel has an abutment spaced inwardly from an edge and overlying a surface of such panel, comprising a pair of integrally hingedly connected J-shaped lock sections each having a long leg and a short leg forming a channel therebetween, the long leg having an integral inwardly projecting abutment at its outer end for engaging an end of the abutment on a panel when such panel is inserted into a channel thereof through the space between said legs, and a flexible hinge strap connecting said legs between the channel portions thereof, said strap being integral with said lock sections and being considerably thinner than the overall thickness between the outside surfaces of said legs at the channel to enable said lock sections to be angularly displaced with respect to each other for interlocking with said panels in a variety of angular positions.

2. The flexible connector structure of claim 1 in which said strap has a restricted portion intermediate the ends thereof of reduced cross section to maximize the flexibility of the strap thereat.

3. The flexible connector structure of claim 1 in which said lock sections and strap are entirely of one-piece extruded plastic construction.

4. The flexible connector structure of claim 3 in which said strap is connected to said lock sections along the mid-portions thereof to permit generally similar angular displacements thereof in opposite directions relative to each other.

5. The flexible connector structure of claim 3 in which said strap is connected to said lock sections along one side thereof, whereby the permissible angular displacement of said lock sections relative to each other in one direction is greater than the permissible angular displacement thereof in the opposite direction.

6. The connector structure of claim 1 in which said strap is connected to said lock sections along the mid-portions thereof to permit generally similar angular displacements thereof in opposite directions relative to each other.

7. The connector structure of claim 6 in which said strap is connected to said lock sections along one side thereof, whereby the permissible angular displacement of said lock sections relative to each other in one direction is greater than the permissible angular displacement thereof in the opposite direction.

8. The connector structure of claim 6 in which the legs of each of said lock sections are spreadable slightly relative to each other to facilitate insertion of such edge portion therebetween.

9. The connector structure of claim 6 in which the legs of each of said lock sections are ordinarily oriented in substantially parallel relation, and in which each of said inwardly projecting abutments is substantially normally disposed with respect to the plane of the associated longer leg.

10. The connector structure of claim 6 in which the legs of each said lock sections converge slightly toward the inner base thereof, and in which each of said abutments is angularly oriented with respect to the plane of the associated longer leg.

11. An interconnected panel and a connector structure comprising adjacent flat panels each having an abutment spaced inwardly from an edge and overlying a surface of such panel; and a connector joining said panels in interlocked relationship comprising a one-piece structure of an integral mass of material having a pair of hingedly connected J-shaped lock sections each having a long leg and a short leg forming a channel therebetween, the long leg having an integral inwardly projecting abutment at its outer end engaging an end surface of an abutment on a panel with the panel engaged within the chamber of such lock section, and a flexible hinge strap connecting said legs between the channel portions thereof, said strap being integral with said lock sections and being considerably thinner than the overall thickness between the outside surfaces of said legs at the channel to enable said lock sections to be angularly displaced with respect to each other for interlocking said panels in a selected one of a variety of angular positions.

12. The structure of claim 11 wherein the abutment on each panel is the end surface of a folded flap integral with said panel and hingedly connected thereto.

References Cited

UNITED STATES PATENTS

| | | | |
|---|---|---|---|
| 2,189,159 | 2/1940 | Anschicks | 52—461 |
| 2,457,002 | 12/1948 | Spiro. | |
| 2,796,624 | 6/1957 | Speer | 52—470 |
| 2,982,290 | 5/1961 | Hunziker | 52—71 |
| 3,008,197 | 11/1961 | Trzyna et al. | 52—578 |
| 3,272,684 | 9/1966 | Moore | 52—309 |

RAMON S. BRITTS, Primary Examiner

U.S. Cl. X.R.

52—71, 309, 470, 578; 287—189